US009342601B1

(12) United States Patent
Finkelstein et al.

(10) Patent No.: US 9,342,601 B1
(45) Date of Patent: May 17, 2016

(54) QUERY FORMULATION AND SEARCH IN THE CONTEXT OF A DISPLAYED DOCUMENT

(71) Applicant: Google Inc., Mountain View, CA (US)

(72) Inventors: Lev Finkelstein, Haifa (IL); Yossi Matias, Tel-Aviv (IL); Tomer Shmiel, Tel-Aviv (IL); Itzhak Barokas, Pardes Hanna (IL); Dror Eiger, Herzliya (IL); Dan Guez, Haifa (IL); Yosi Markovich, Tel-Aviv (IL); Shaul Markovitch, Haifa (IL); Giora Unger, Haifa (IL)

(73) Assignee: Google Inc., Mountain View, CA (US)

( * ) Notice: Subject to any disclaimer, the term of this patent is extended or adjusted under 35 U.S.C. 154(b) by 148 days.

(21) Appl. No.: 13/774,711

(22) Filed: Feb. 22, 2013

Related U.S. Application Data

(60) Provisional application No. 61/603,139, filed on Feb. 24, 2012.

(51) Int. Cl.
*G06F 17/30* (2006.01)
(52) U.S. Cl.
CPC .................. *G06F 17/30864* (2013.01)
(58) Field of Classification Search
CPC ............. G06F 17/30864; G06F 17/30696; G06F 17/30867
USPC .......................................................... 707/723
See application file for complete search history.

(56) References Cited

U.S. PATENT DOCUMENTS

| 5,845,300 | A | 12/1998 | Comer et al. |
| 6,377,965 | B1 | 4/2002 | Hachamovitch et al. |
| 6,564,213 | B1 | 5/2003 | Ortega et al. |
| 7,487,145 | B1 | 2/2009 | Gibbs et al. |
| 7,499,940 | B1 | 3/2009 | Gibbs |
| 7,603,349 | B1 * | 10/2009 | Kraft ................. G06F 17/30867 707/999.003 |
| 7,756,855 | B2 | 7/2010 | Ismalon |
| 7,836,044 | B2 | 11/2010 | Kamvar et al. |
| 7,849,104 | B2 * | 12/2010 | Sun et al. ...................... 707/798 |
| 7,958,136 | B1 | 6/2011 | Curtis et al. |
| 8,086,619 | B2 * | 12/2011 | Haahr et al. .................. 707/765 |
| 8,543,907 | B1 * | 9/2013 | Roskind ......................... 715/234 |
| 8,972,388 | B1 * | 3/2015 | Finkelstein et al. .......... 707/723 |
| 2003/0018629 | A1 | 1/2003 | Namba |
| 2006/0106769 | A1 | 5/2006 | Gibbs |
| 2007/0112764 | A1 | 5/2007 | Yih et al. |
| 2007/0185865 | A1 | 8/2007 | Budzik et al. |
| 2008/0091537 | A1 * | 4/2008 | Miller et al. .................... 705/14 |

(Continued)

FOREIGN PATENT DOCUMENTS

WO      2006055120      7/2006

*Primary Examiner* — Scott A Waldron
*Assistant Examiner* — Dongming Wang
(74) *Attorney, Agent, or Firm* — Middleton Reutlinger (57) ABSTRACT

Technology described herein enhances a user's search experience by providing refined search results that are relevant to a displayed document. Contextual search results are obtained which identify a list of documents responsive to a formulated query that is based on the user's search query, as well as one or more supplemental terms that are based on content in the displayed document during user entry of the search query. The contextual search results are then "refined" by re-ranking the documents in the list, based on the similarity between the user's original search query and terms in these documents. This re-ranking enables contextual search results to be provided that are also highly relevant to the user's informational need.

15 Claims, 8 Drawing Sheets

(56) References Cited

U.S. PATENT DOCUMENTS

| | | |
|---|---|---|
| 2008/0114721 A1 | 5/2008 | Jones et al. |
| 2008/0147637 A1 | 6/2008 | Li et al. |
| 2009/0019028 A1 | 1/2009 | Norris et al. |
| 2009/0198677 A1 | 8/2009 | Sheehy et al. |
| 2010/0318538 A1 | 12/2010 | Wyman et al. |
| 2011/0093488 A1 | 4/2011 | Amacker et al. |
| 2011/0258227 A1 | 10/2011 | Lacasse |
| 2012/0084310 A1* | 4/2012 | Lieb ............................ 707/766 |
| 2012/0109884 A1 | 5/2012 | Goldentouch |
| 2012/0130978 A1 | 5/2012 | Li et al. |
| 2012/0240037 A1 | 9/2012 | Migos et al. |
| 2014/0172900 A1* | 6/2014 | De Barros et al. ............ 707/765 |

\* cited by examiner

QUERY FORMULATION AND SEARCH IN THE CONTEXT OF A DISPLAYED DOCUMENT

CROSS REFERENCE TO RELATED APPLICATIONS

This application claims the benefit of U.S. Provisional Application No. 61/603,139 filed on Feb. 24, 2012, entitled "Query Formulation and Search in the Context of a Currently Displayed Document," which is incorporated by reference herein in its entirety.

BACKGROUND

The present disclosure relates to information retrieval.

Information retrieval systems, especially Internet search engines, help users by retrieving information, such as web pages, images, text documents and multimedia content, in response to queries. A search engine locates and stores the location of resources and various descriptions of the information in a searchable index. The search engine may then use a variety of signals to determine the relevance of the resources in the index to the user's query.

Formulating a query that accurately represents the user's informational need can be challenging. For example, users may use query terms which are too general or ambiguous to yield high quality search results. That is, the search engine may return a number of resources which match the user's query, but which are unrelated to the informational need of the user. In such a case, the user may have to enter a number of different queries about the same topic before reaching resources that are of interest to the user. Refining the search can be a time-consuming and frustrating experience for the user.

It is desirable to provide improved techniques for providing meaningful search results to the user conducting the search.

SUMMARY

In one implementation, a method is described including receiving a query entered into a search field on a computing device, and receiving data indicating a document displayed on the computing device during entry of the query. The method includes adding one or more supplemental terms to the received query to form a formulated query. The supplemental terms are based on content in the displayed document. The method also includes identifying search result documents responsive to the formulated query. The method further includes calculating similarity scores for the search result documents. A similarity score for a given search result document of the search result documents is based at least in part on similarity between the received query and terms in the given search result document. The method further includes ranking the search result documents in the list based at least in part on the similarity scores. The method further includes transmitting search results for display on the computing device, the search results based on the ranked search result documents.

This method and other implementations of the technology disclosed can each optionally include one or more of the following features.

The method can further identifying second search result documents responsive to the received query. Similarity scores can then be calculated for search result documents in the second list. A similarity score for a given second search result document of the second search result documents is based at least in part on similarity between the given second search result document and the one or more supplemental terms. Documents in the second list to be included in the search results can then be selected based at least in part on the similarity scores of the second search result documents.

The method can further include forming a plurality of unique formulated queries including said formulated query. Unique formulated queries can be formed by adding one or more of the supplemental terms to the received query. Search results can be obtained identifying respective lists of documents responsive to corresponding unique formulated queries in the plurality of unique formulated queries. Similarity scores can then be calculated for documents in the respective lists of documents. Documents in the lists to be included in the search results can then be selected based at least in part on the similarity scores of the search result documents.

Identifying the search result documents responsive to the formulated queries can include obtaining search quality scores for documents in the respective lists of documents. Selecting documents in the lists of documents to include in the search results can be further based on the search quality scores.

The supplemental terms can include one or more terms representing a topic of the identified document. The document can be displayed within an application containing the search field. The document can be displayed within a different application than an application containing the search field.

The received data can include a unique document identifier for the displayed document. The unique document identifier can be a Uniform Resource Locator for the displayed document. The received data can include one or more terms in the displayed document.

Other implementations may include a non-transitory computer readable storage medium storing instructions executable by a processor to perform a method such as one or more methods described herein. Yet another implementation may include a system including memory and one or more processors operable to execute instructions, stored in the memory, to perform a method such as one or more methods described herein.

Particular implementations of the subject matter described herein can enhance a user's search experience by providing refined search results that are relevant to a document that is currently being displayed to the user. Contextual search results are obtained which identify a list of documents responsive to a formulated query that is based on the user's search query, as well as one or more supplemental terms that are based on content in the displayed document during user entry of the search query. The contextual search results are then "refined" by re-ranking the documents in the list, based on the similarity between the user's original search query and terms in these documents. This re-ranking enables contextual search results to be provided that are also highly relevant to the user's informational need. This allows the user to obtain relevant search results in response to search query that would otherwise be too general or ambiguous. As a result, contextually-relevant search results can thus be provided which can assist users in efficiently finding the information they seek.

In another implementation, a method is described that includes receiving a partial query entered into a search field on a computing device, and receiving data indicating a document displayed on the computing device during entry of the partial query. The method also includes identifying a list of query completions for the partial query. The method further includes calculating similarity scores for query completions in the list. A similarity score for a given query completion is based at least in part on similarity between the given query completion and content in the displayed document. The method also includes ranking the query completions based on the similarity scores. The method also includes selecting one or more query completions as refined query completions for the partial query based at least in part on the ranking. The method further includes providing the refined query completions for display on the computing device.

This method and other implementations of the technology disclosed can each optionally include one or more of the following features.

The number of refined query completions may be less than the number of query completions in the list.

Selecting one or more query completions as refined query completions for the partial query may include selecting a predetermined number of highest ranked query completions as the refined query completions.

The method may further include obtaining one or more supplemental terms based on content in the displayed document. The similarity score for the given query completion may then based at least in part on similarity between the given query completion and the one or more supplemental terms.

The supplemental terms may include one or more terms representing a topic of the displayed document.

The document may be displayed within an application containing the search field.

The received data may include a unique document identifier for the displayed document. The unique document identifier may be a Uniform Resource Locator for the displayed document.

The received data may include one or more terms in the displayed document.

Particular implementations of the subject matter described herein can enhance a user's search experience by providing refined query completions that are relevant to a document that is currently being displayed to the user. As a result, meaningful query completions can be provided which can assist users in finding the information they seek.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Particular aspects of one or more implementations of the subject matter described in this specification are set forth in the drawings and the description below. Other features, aspects, and advantages of the subject matter will become apparent from the description, the drawings, and the claims.

DETAILED DESCRIPTION

Technology described herein enhances a user's search experience by providing refined search results that are relevant to a document that is displayed to the user. Contextual search results are first obtained which identify a list of documents responsive to a formulated query that is based on the user's search query, as well as one or more supplemental terms that are based on content in the displayed document during user entry of the search query. The supplemental term(s) may represent one or more concepts or topics in the displayed document.

The contextual search results are then "refined" by re-ranking the documents in the list, based on the similarity between the user's original search query and terms in these documents. This re-ranking enables contextual search results to be provided that are also highly relevant to the user's informational need.

The techniques described herein enable relevant search results to be provided in response to a user's search query that may otherwise be too general or ambiguous. Contextually-relevant search results can thus be provided which can assist users in efficiently finding the information they seek.

Technology described herein also enhances a user's search experience by providing refined query completions that are relevant to a document that is displayed to the user. These query completions are "refined" because they are based on a partial query that is being entered by the user, as well as the similarity between the query completions and the content in the displayed document during entry of the partial query. These refined query completions represent queries relevant to the displayed document which the user may want to submit instead of the partial query actually being typed.

Environment Overview

Figure 1:
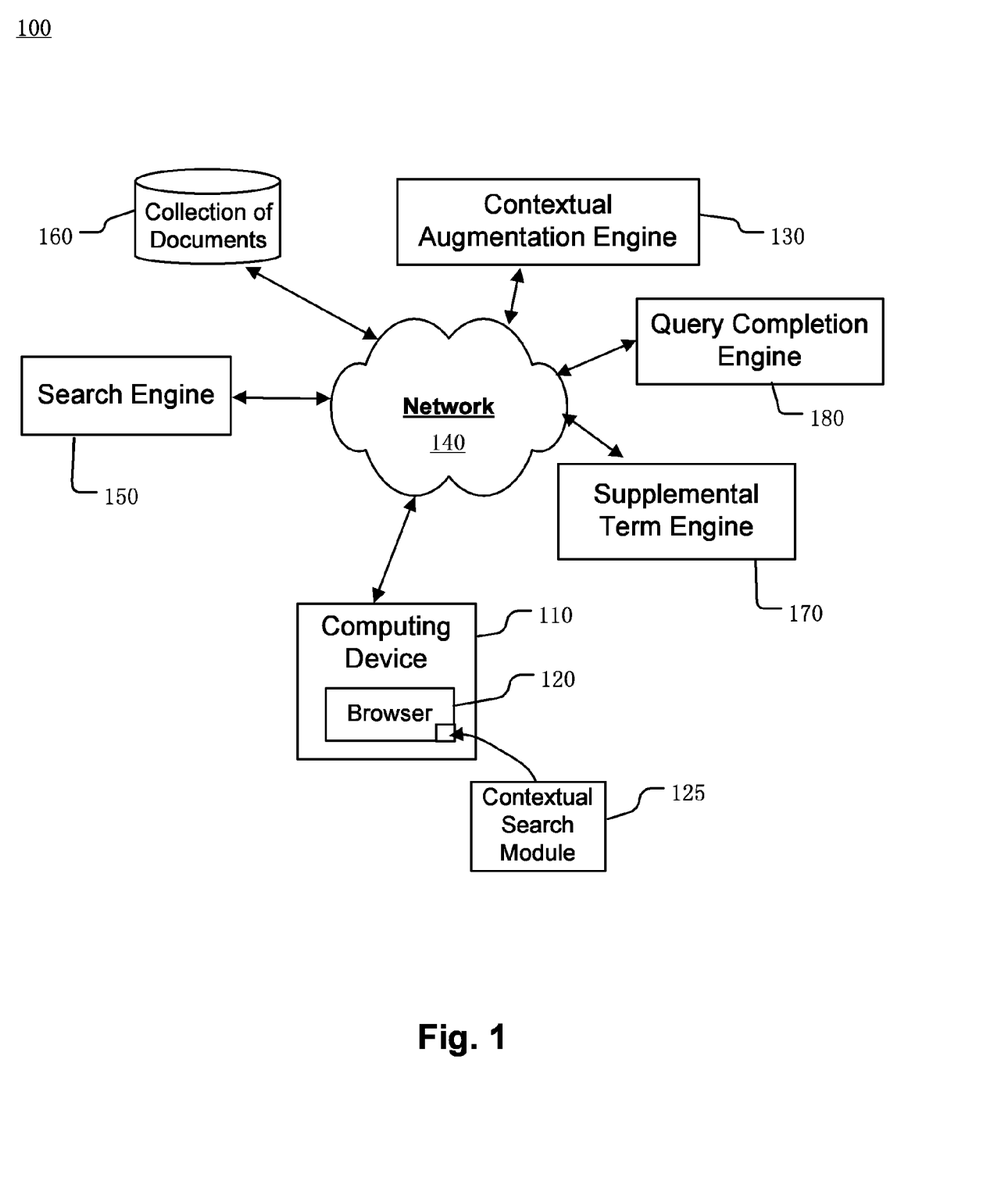
FIG. 1 illustrates a block diagram of an example environment for providing refined search results to users of client devices.

FIG. 1 illustrates a block diagram of an example environment 100 for providing refined search results and refined query completions to users of client devices. The environment 100 includes a client computing device 110. The environment 100 also includes a communication network 140 that allows for communication between various components of the environment 100.

The network 140 facilitates communication between the various components in the environment 100. In one implementation, the network 140 includes the Internet. The network 140 can also utilize dedicated or private communication links that are not necessarily part of the Internet. In one implementation, the network 140 uses standard communications technologies, protocols, and/or inter-process communication techniques.

The client computing device 110 includes memory for storage of data and software applications, a processor for accessing data and executing applications, and components that facilitate communication over the communication network 140.

The client computing device 110 executes an application, such as a web browser 120, which allows a user to view documents in a collection of documents 160 that are provided over the network 140.

The collection of documents 160 may be collectively stored on multiple computers and/or storage devices. The documents in the collection of documents 160 may be associated with unique document identifiers. A unique document identifier may be a Uniform Resource Locator (URL) of the associated document.

A document in the collection of documents 160 may be a web page, a word processing document, a portable document format (PDF) document, or any other type of electronic document. A document includes content such as words, phrases, images and videos. The content in the document can also include embedded information such as meta data and hyperlinks, and embedded instructions such as JavaScript scripts. As used herein, content refers generally to the electronic data in a particular document.

The client computing device 110 also executes a contextual search module 125. The client-side functionality of the contextual search module 125 can be implemented as a web browser add-on, e.g. a plug-in or an extension to the browser 120. The contextual search module 125 may alternatively be implemented as a toolbar running in the browser 120. As another example, the functionality of the contextual search module 125 can be integrated into the browser 120 or other software executing on the client computing device 110.

Augmentation of Search Results

The contextual search module 125 may provide a search field in a user interface in this example. Alternatively, the search field may be provided within the user interface of another application, such as the browser 120, executing on the client computing device 110. The search field allows the user to enter a search query and submit it to a contextual augmentation engine 130 (described below). The user may submit the search query by selecting a search button displayed in the user interface adjacent to the search field. As another example, the user may submit the search query by entering a carriage return or equivalent character. As another example, the user may submit the search query by saying a command in a speech interface or pausing for more than a predetermined period of time.

The contextual search module 125 also transmits data to the contextual augmentation engine 130 indicating a document that is displayed on the client computing device 110 during entry of the query into the search field. In the following discussion, the contextual search module 125 transmits data indicating the document that is currently displayed within the browser 120. In other implementations, the transmitted data may indicate multiple documents that are currently displayed in different tabs within the browser 120. In yet other implementations, the transmitted data may indicate one or more documents displayed in one or more different applications executing on the client computing device 110.

The transmitted data may be a unique document identifier, such as the URL, of the displayed document. Such a unique identifier may be available both for web pages and for content stored in the cloud or on an accessible server. Alternatively, other data that can be used to uniquely identify the displayed document may be transmitted.

In other implementations, the transmitted data may be data that has been extracted from the displayed document for use in determining content of the displayed document. For example, this data may be certain human readable text within the displayed document, such as the title, or embedded information such as metadata.

The contextual augmentation engine 130 receives the user's search query and the data indicating the document displayed in the browser 120. The contextual augmentation engine 130 may be implemented in hardware, firmware or software running on hardware.

The contextual augmentation engine 130 forwards the data indicating the displayed document to a supplemental term engine 170. The supplemental term engine 130 includes memory for storage of data and software applications, a processor for accessing data and executing applications, and components that facilitate communication over the communication network 140.

In implementations in which the transmitted data identifies a document in the collection of documents 160, the supplemental term engine 170 provides one or more supplemental terms to the contextual augmentation engine 130 based on the content in the identified document.

The supplemental term(s) may represent one or more concepts or topics in the displayed document. The supplemental term(s) may occur in human readable text within the document, in embedded information such as meta data, and/or in the title or URL of the associated document. In some implementations, the supplemental term(s) may represent the predominant topic of the document. A topic can be the predominant topic of the document if the topic describes more than a threshold proportion of the associated document. In general, the supplemental term(s) may be extracted from or otherwise gathered from the associated document using conventional or other techniques.

The supplemental term engine 170 may compile and store the supplemental term(s) by analyzing the documents in the collection of documents 160 offline. Upon receiving the identifying data, the supplemental term engine 170 can then retrieve the stored supplemental terms associated with the displayed document. Alternatively, the supplemental term engine 170 may compile the supplemental terms in real time by analyzing the document displayed in the browser 120 upon receiving the identifying data.

The supplemental term engine 170 may also provide supplemental terms based on prior search queries submitted by past users. The supplemental term engine 170 may determine the supplemental terms for a given document based on user response to search results that include the given document. For example, the supplemental term engine 170 may analyze a log of past user search session data to determine the search queries that resulted in the selection of the given document in the search results. The past user search session data may not be tethered to the identity of a specific user.

As described above, in some implementations the contextual search module 125 may provide data extracted from the displayed document. In such a case, the supplemental term engine 170 analyzes the extracted data to determine the supplemental terms for the displayed document. For example, the supplemental term engine 170 may select terms occurring in the extracted data as the supplemental terms for the displayed document. The terms in the extracted data may for example be scored based on where the terms occur in the document. In such a case, the occurrence of a term in certain portions of the document, such as the title, may be considered to be a better indicator of the content of the document, than terms occurring in other portions of the document. One or more of the highest scoring terms may then be selected as the supplemental terms for the displayed document.

The contextual augmentation engine 130 formulates a set of one or more unique formulated queries. A formulated query is formed by adding one or more of the supplemental terms to the user's search query. A formulated query is unique if it is not identical to another formulated query in the set. A formulated query may include operators such as Boolean operators, e.g. AND or OR, between the supplemental terms. The formulated query may for example include all of the terms in the user's search query, in the same order that they appear in the user's query. In other implementations, one or terms in the user's query may be replaced with a synonym.

The order of the terms in the user's query may also be changed in the formulated query in some implementations.

As an example, a user may submit a search query "reviews" when viewing a web page about model ABC123 digital camera manufactured by Acme Cameras, Inc. The supplemental term engine 170 may then return "ABC123", "acme camera" and "acme camera ABC123" as supplemental terms associated with the web page currently being viewed. In such a case, the set of formulated queries formed by the contextual augmentation engine 130 can be "ABC123 reviews", "acme camera reviews" and "reviews acme camera ABC123".

The contextual augmentation engine 130 obtains search results for the set of formulated queries from a search engine 150. The search engine 150 includes memory for storage of data and software applications, a processor for accessing data and executing applications, and components that facilitate communication over the communication network 140.

In order to obtain the search results, the contextual augmentation engine 130 first sends the set of formulated queries to the search engine 150. The search engine 150 then responds by transmitting search results to the contextual augmentation engine 130. The search results identify lists of documents in the collection of documents 160 that are responsive to the corresponding formulated queries in the set. The search engine 150 can use conventional or other techniques to identify the documents that are responsive to a formulated query in the set.

In some implementations, the contextual augmentation engine 130 also obtains search quality scores for the documents identified in the search results. The search quality scores are assigned to the documents in the search results by the search engine 150 using a scoring function used to rank the search results. The search engine 150 can use conventional or other techniques to calculate the search quality scores.

The contextual augmentation engine 130 then calculates similarity scores for the documents in the obtained search results. The similarity score for a given document is based at least in part on the similarity between the user's search query and terms that occur within the given document.

The techniques for calculating the similarity scores can vary from implementation to implementation. For example, the similarity score for a given document may be calculated by computing the semantic similarity distance between the user's search query and a given document using latent semantic indexing. Latent semantic indexing enables the identification of documents with content having similar meanings to the user's search query, even if the content does not include the specific terms in the user's query. Alternatively, other metrics may be used to calculate the semantic similarity distance. For example, the semantic similarity distance for a given document may be based on the term frequency-inverse document frequency of each search query term.

As another example, the similarity score for a given document may be calculated by mapping the terms in the document onto a predefined set of N axes that represent different topics. Each term in the document may be represented as a vector in N-dimensional space, and the entire document may be represented as document vector that is a sum of the corresponding term vectors. The mapping of the terms may be carried out using a variety of techniques. For example, the mapping may be carried out by calculating statistical characteristics of each term in different corpora, and representing the term as a vector of Xi, where Xi is the frequency of the term in corpora i. The similarity score can then be calculated as the cosine similarity between the document vector and a vector representing the mapping of the user's query terms onto the set of axes. Alternatively, other techniques may be used to calculate the similarity scores.

The contextual augmentation engine 130 then creates refined search results by ranking the documents based at least in part on their similarity scores. The documents may for example be ranked by calculating refined ranking scores using the similarity scores. The refined ranking score for a given document may for example be based on a weighted average of its similarity score to the user's search query and its search quality score to the set of formulated queries.

As described above, in some implementations the contextual augmentation engine 130 obtains multiple search results for multiple formulated queries. As a result, the same document may appear in more than one search result. In such a case, the contextual augmentation engine 130 can calculate a final search quality score for the document. The final search quality score for a given document is based on the individual search quality scores for each of the search results which include the given document.

For example, the final search quality score for a particular document can be a function of the obtained search quality scores of each search result that identifies the particular document, a product of the obtained search quality scores, the maximum of the obtained search quality scores, and so on. The refined ranking score for the document can then be calculated based on a weighted average of its final search quality score and its similarity score.

The contextual augmentation engine 130 then selects the documents to include in the refined search results based on their ranking. For example, a predetermined number of the highest ranked documents may be selected. Alternatively, other criteria may be used. For example, the ranking scores may be compared to a threshold, and the documents that satisfy the threshold may be selected.

The refined search results are then transmitted to the computing device 110 in a form that can be displayed to the user. For example, the contextual augmentation engine 130 may transmit a search results web page to be displayed in the browser 120 executing on the client computing device 110.

In some implementations, the contextual augmentation engine 130 may also or alternatively provide the original received query to the search engine 150. The search engine 150 responds by transmitting search results identifying a list of documents in the collection of documents 160 that are responsive to original received query. In other words, these search results are not contextual to the displayed document. In such a case, the contextual augmentation engine 130 may request that a relatively large number of documents be provided, so that a sufficient number of contextual documents can then be identified (described below).

The contextual augmentation engine 130 can then use the supplemental terms associated with the displayed document to calculate similarity scores for the documents in these non-contextual search results. The similarity score for a given document in the non-contextual search results is based at least in part on the similarity between the supplemental terms and terms that occur within the given document. These similarity scores may for example be calculated using the techniques described above.

The contextual augmentation engine 130 then uses the similarity scores to rank and select the documents to include in the refined search results. Similar to the discussion above, the contextual augmentation engine 130 may calculate refined ranking scores for each of the documents based on a weighted average of its similarity score and its search quality score.

In some implementations the contextual augmentation engine 130 obtains contextual search results responsive to one or more formulated query, and non-contextual search results responsive to the original received query. In such a case, the contextual augmentation engine 130 uses the ranking scores to merge the contextual search results and the non-contextual search results and form the refined search results.

Augmentation of Query Completions

The contextual search module 125 on the client computing device 110 also transmits partial queries being entered into the search field to the contextual augmentation engine 130. A "partial query" is a query formulated by a user prior to an explicit request from the user to submit the query.

In some implementations, the contextual search module 125 transmits each character of a query as it is being typed or otherwise entered by the user into the search field. In other implementations, multiple characters at a time may be provided following a pause between entry of characters by the user, or once a predetermined number of characters have been entered.

The contextual search module 125 also transmits data indicating the document that is displayed in the browser 120 during entry of the partial query to the contextual augmentation engine 130.

The contextual augmentation engine 130 forwards the partial query to a query completion engine 180. The query completion engine 180 includes memory for storage of data and software applications, a processor for accessing data and executing applications, and components that facilitate communication over the communication network 140.

In response to the partial query, the query completion engine 180 provides a list of suggested query completions for the partial query to the contextual augmentation engine 130. The query completion engine 180 may use conventional or other techniques to determine suggested query completions for the partial query. For example, the query completion engine 180 may use prefix based matching. The query completion engine 180 may also use other techniques to select the suggested query completions.

The query completion engine 180 may provide initial ranking scores that were used to determine the suggested query completions for the partial query. The initial ranking scores may for example be based on popularity. In one implementation, popularity is determined based on frequency with which past users submitted the suggested query completions as complete queries.

In implementations in which the transmitted data identifies a document in the collection of documents 160, the contextual augmentation engine 130 may forward this identifying data to a supplemental term engine 170. Similar to the discussion above, the contextual augmentation engine 130 obtains one or more supplemental terms from the supplemental term engine 170 based on the content in the displayed document.

The contextual augmentation engine 130 then calculates similarity scores for query completions in the list. The similarity score for a given query completion may be based on the similarity between the given query completion and the supplemental terms. The similarity score may for example be calculated using the techniques described above.

Alternatively, other techniques may be used to calculate similarity scores based on the similarity between the query completions and the content in the displayed document. For example, the similarity score may be calculated based on the similarity between the query completions and terms in the displayed document. These similarity scores may for example be calculated using the techniques described above.

The contextual augmentation engine 130 then ranks the query completions in the list based at least in part on the similarity scores. The query completions may for example be ranked by calculating revised ranking scores using the similarity scores. The revised ranking score for a given query completion may for example be a function of its initial ranking score and its similarity score. The revised ranking score for a given query completion may for example be a weighted average of its initial ranking score and its similarity score.

The contextual augmentation engine 130 then selects one or more of the query completions as refined query completions for the partial query based at least in part on their ranking. For example, a predetermined number of the highest ranked query completions may be selected. Alternatively, other criteria may be used. For example, the revised ranking scores may be compared to a threshold, and the documents that satisfy the threshold may be selected.

The contextual augmentation engine 130 provides the refined query completions for display on the computing device 110. These refined query completions represent queries relevant to the displayed document, which the user may want to submit instead of the partial query actually being typed. The refined query completions may be displayed within a cascaded menu above or below the search field as the user is typing.

As an example, a user may type a partial query "re" when viewing a web page about a Canon SX10IS digital camera. The contextual augmentation engine 130 may return "reviews SX10IS" as a refined query completion for the partial query.

Upon selection of a refined query completion by the user, the contextual augmentation engine 130 may obtain search results from the search engine 150 responsive to the selected refined query completion. The search results can then be transmitted to the computing device 110 in a form that can be displayed to the user. For example, the contextual augmentation engine 130 may transmit a search results web page to be displayed in the browser 120 executing on the client computing device 110.

Many other configurations are possible having more or less components than the environment 100 shown in FIG. 1. For example, the environment 100 can include multiple search engines. The environment 100 can also include many more client computing devices that submit queries to the search engines.

Figure 2:
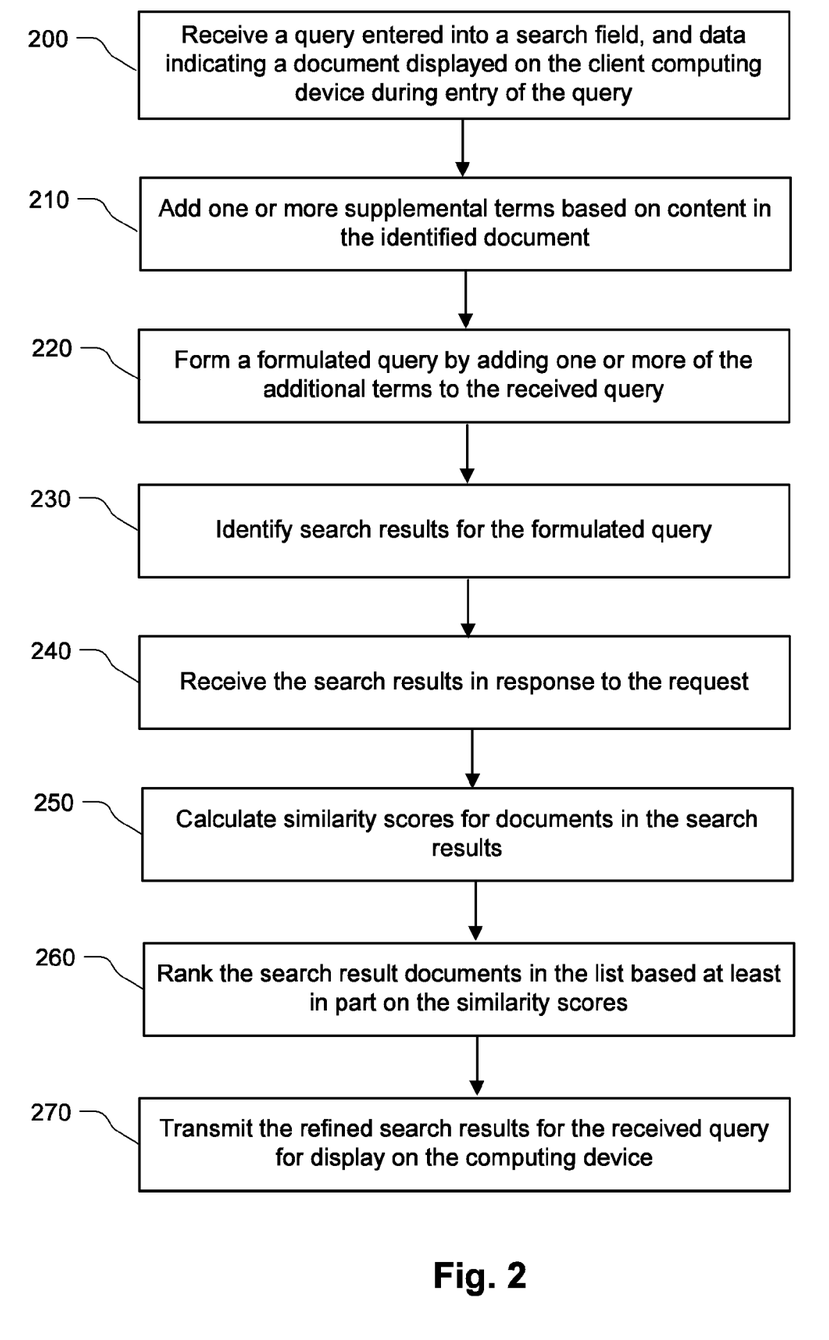
FIG. 2 is a flow chart illustrating an example process for providing refined search results that are relevant to a document currently being viewed by a user.

FIG. 2 is a flow chart illustrating an example process for forming a formulated query and providing refined search results that are relevant to a document currently being viewed by a user. Other embodiments may perform the steps in different orders and/or perform different or additional steps than the ones illustrated in FIG. 2. For convenience, FIG. 2 will be described with reference to a system of one or more computers that performs the process. The system can be, for example, the contextual augmentation engine 130 described above with reference to FIG. 1.

At step 200, the system receives a query entered into a search field on a computing device. The system also receives data indicating a document displayed on the client computing device during entry of the query.

At step 210, the system obtains one or more supplemental terms based on content in the identified document. At step 220, the system forms a formulated query by adding one or more of the supplemental terms to the received query.

At step 230, the system requests search results for the formulated query. At step 240, the system receives the search results in response to the request.

At step 250, the system calculates similarity scores for documents in the search results. At step 260, the system creates refined search results by ranking the documents based at least in part on the similarity scores.

At step 270, the system transmits the refined search results for the received query for display on the computing device.

The steps 220, 230, 240 may also performed using multiple unique formulated queries. The multiple search results responsive to the formulated queries may then be merged to produce the refined search results prior to transmission at step 270.

Figure 3:
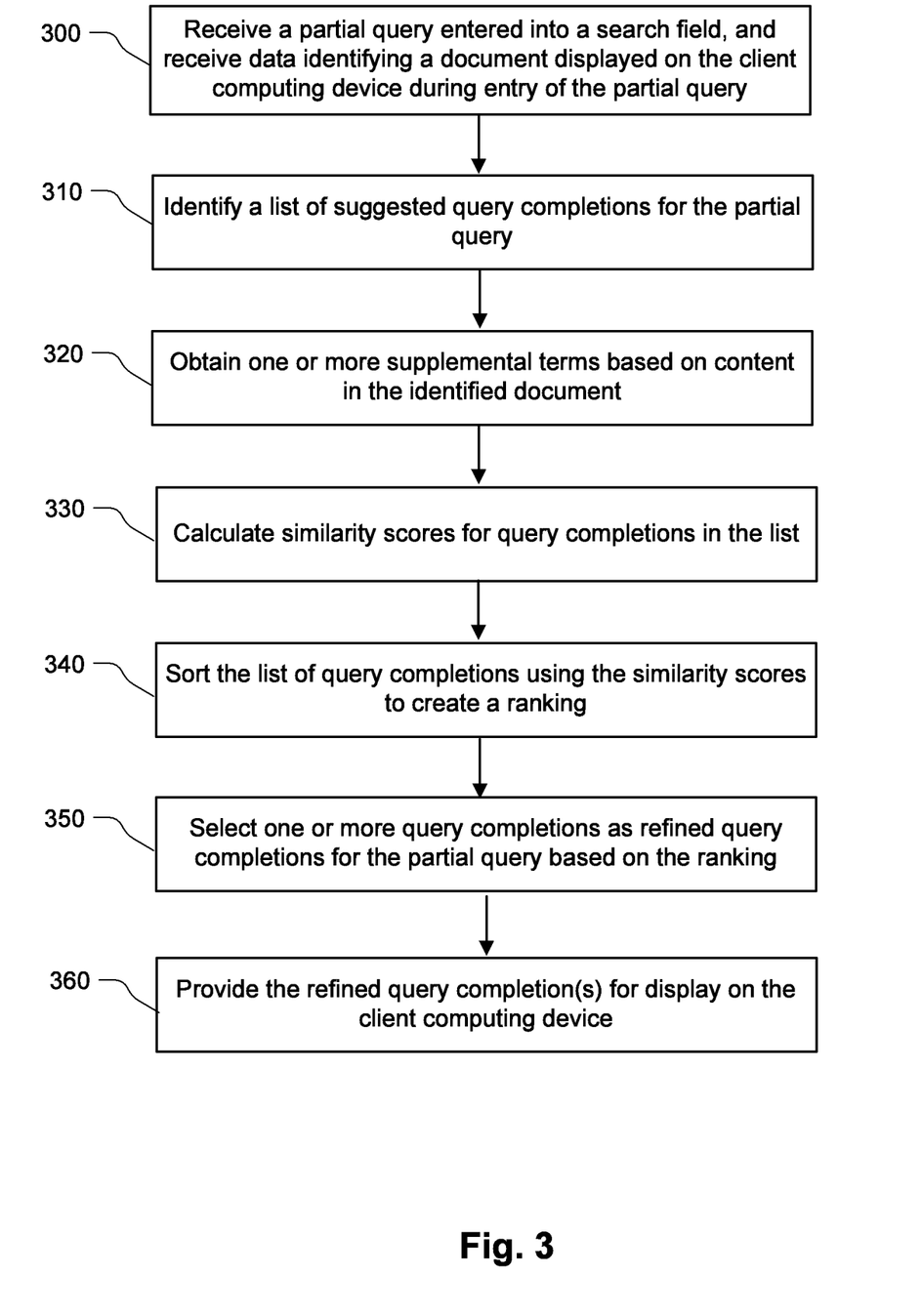
FIG. 3 is a flow chart illustrating an example process for providing refined query completions that are relevant to a document currently being viewed by a user.

FIG. 3 is a flow chart illustrating an example process for providing refined query completions that are relevant to a document currently being viewed by a user. Other embodiments may perform the steps in different orders and/or perform different or additional steps than the ones illustrated in FIG. 3. For convenience, FIG. 3 will be described with reference to a system of one or more computers that performs the process. The system can be, for example, the contextual augmentation engine 130 described above with reference to FIG. 1.

At step 300, the system receives a partial query entered into a search field on a computing device. The system also receives data indicating a document displayed on the client computing device during entry of the partial query.

At step 310, the system obtains one or more suggested query completions for the partial query. At step 320, the system obtains one or more supplemental terms based on content in the identified document.

At step 330, the system calculates similarity scores for query completions in the list. The similarity score for a given query completion is based at least in part on the similarity between the given query completion and the obtained supplemental terms.

At step 340, the system sorts the list of query completions using the similarity scores to create a ranking. At step 350, the system selects one or more query completions as refined query completions for the partial query based at least in part on the rankings.

At step 360, the system transmits one or more of the refined query completions for display on the computing device.

Figure 4:
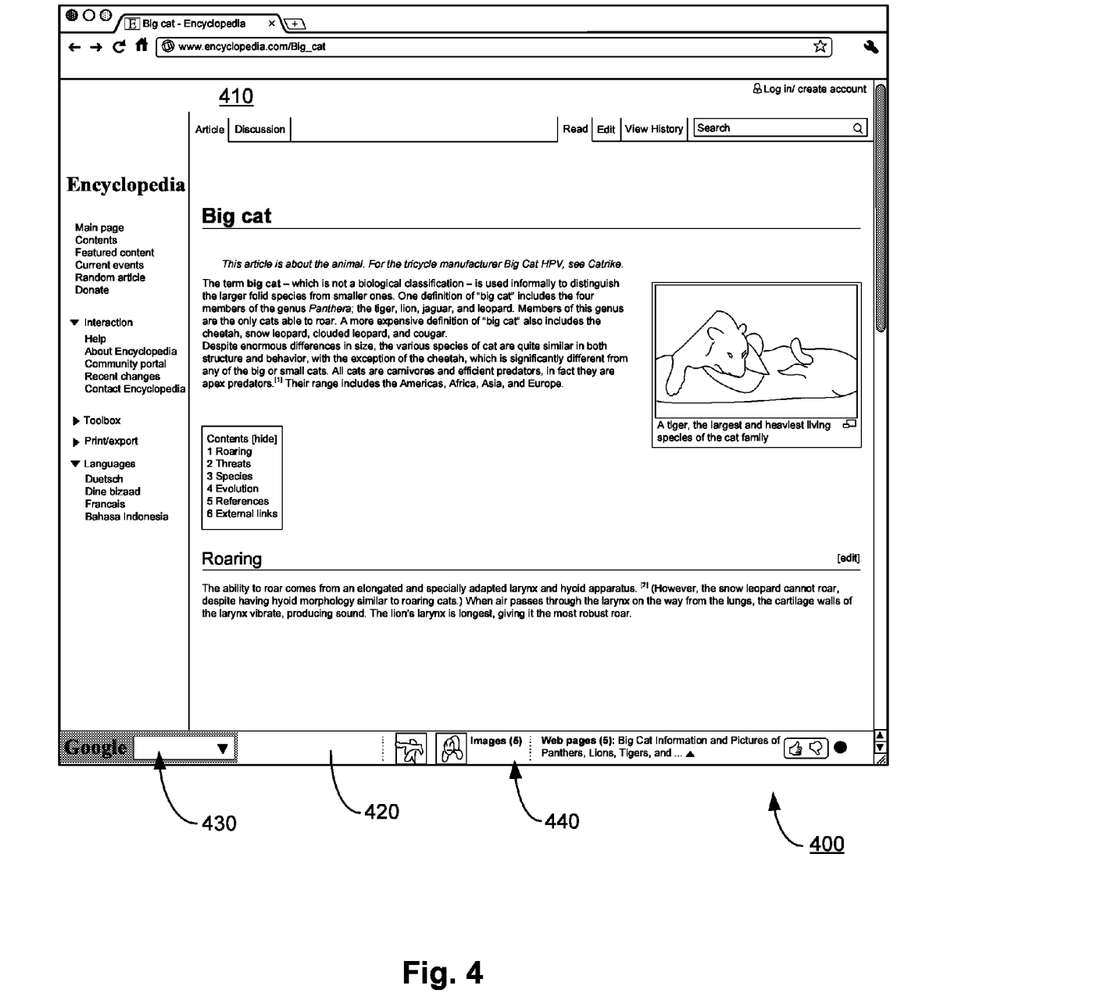
FIG. 4 is an example user interface that can be used to search for documents relevant to a document about big cats.

FIG. 4 is an example user interface 400 that can be used to search for documents relevant to a displayed document 410. The user interface 400 includes a document 410 that is displayed to a user on a browser executing on a client computing device. In this example, the document 410 is a web page about big cats from an online encyclopedia.

The user interface 400 also includes a user interface element 420. The user interface element 420 includes a search field 430. The search field 430 allows the user to enter and submit a query to obtain refined search results relevant to "big cats" in the document 410 using the techniques described herein. The supplemental terms for this displayed document 410 may include for example the terms "cats" and "feline", since these terms represent concepts described in the displayed document 410.

The user interface element 420 can also present relevant refined query completions as the user is typing a partial query into the search field 430 using the techniques described herein. The refined query completions for the partial query can then be provided in a menu displayed above the search field 430. The user interface element 420 can also include a portion 440 dedicated to presenting additional content relevant to the content in the document 410.

The user interface element 420 in the illustrated example is shown at the bottom of the user interface 400. Alternatively, the user interface element 420 can be located in other positions on the user interface 400. The position of the user interface element 420 may also be user configurable.

Figure 5:
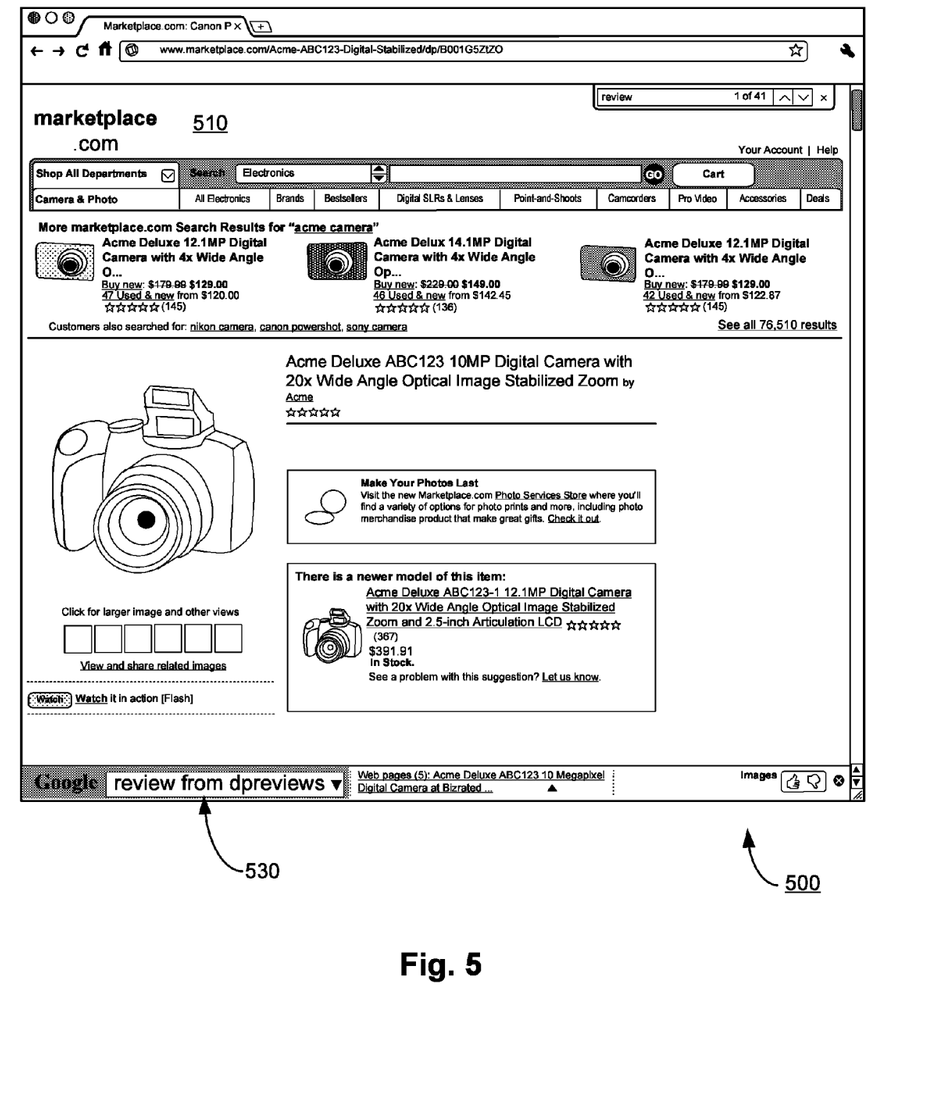
FIG. 5 is an example user interface that can be used to search for documents relevant to a document about a digital camera.

FIG. 5 is an example user interface 500 that can be used to search for documents relevant to a document 510. In this example, the document is a web page about a digital camera from an online store. The search field 530 allows a user to enter and submit a query to obtain refined search results relevant to the digital camera described in the document 510 using the techniques described above. In this example, the user has typed a query "review from dpsreviews". One of the supplemental terms for this displayed document 510 may be "ABC123", since that term is the model of the digital camera described in the displayed document 510. In such a case, a formulated query for the user's query may be "review from dpsreviews ABC123".

Figure 6:
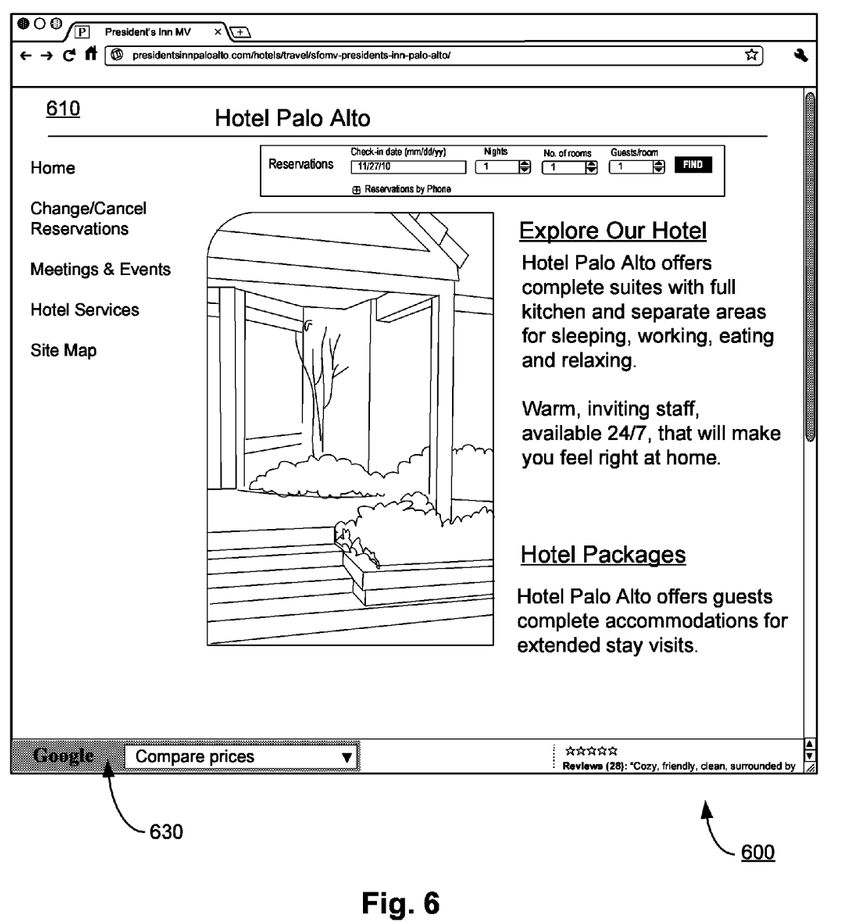
FIG. 6 is an example user interface that can be used to search for documents relevant to a document about a hotel.

FIG. 6 is an example user interface 600 that can be used to search for documents relevant to a document 610. In this example, the document 610 is a web page about a hotel. The search field 630 allows a user to enter and submit a query to obtain refined search results relevant to the hotel in the document 610 using the techniques described above. In this example, the user has typed a query "compare prices". The supplemental terms for this displayed document 610 may include "hotel" and "Palo Alto", since the hotel described in the displayed document 610 is located in Palo Alto, Calif. In such a case, a formulated query for the user's query may be "compare prices hotel Palo Alto".

Figure 7:
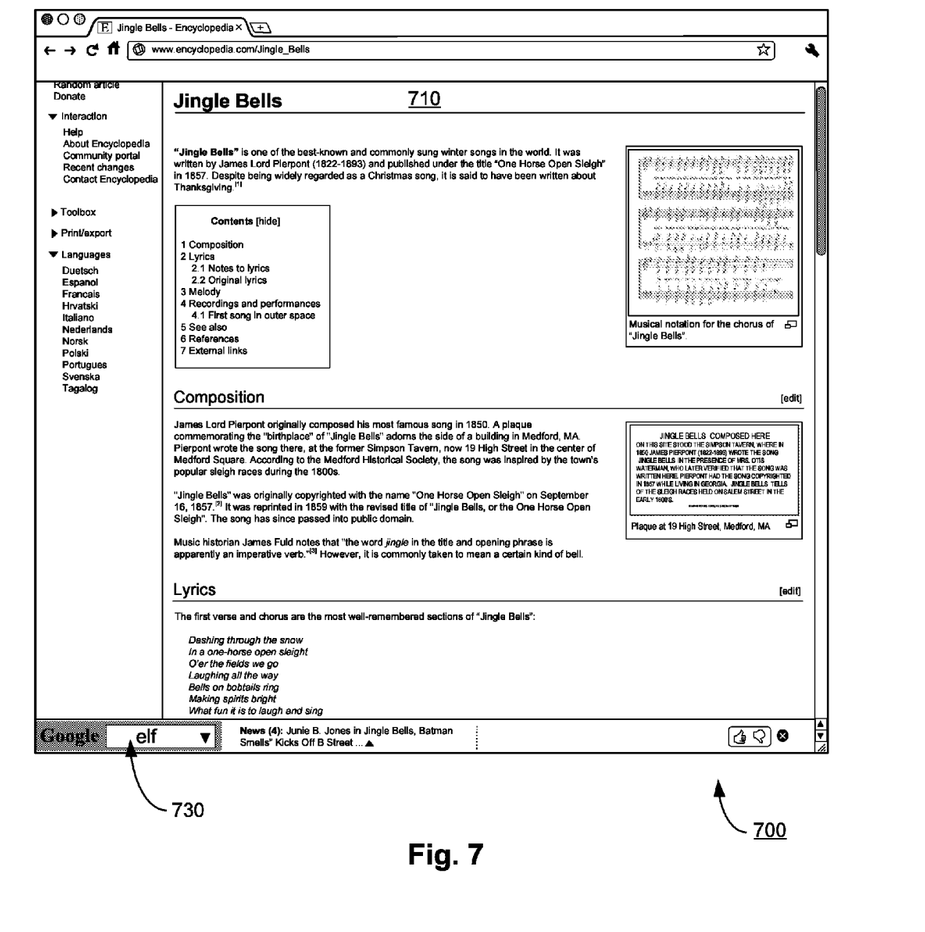
FIG. 7 is an example user interface that can be used to search for documents relevant to a document about a song.

FIG. 7 is an example user interface 700 that can be used to search for documents relevant to a document 710. In this example, the document 710 is a web page about the song "Jingle Bells" from an online encyclopedia. The search field 730 allows a user to enter and submit a query to obtain refined search results relevant to the song. In this example, the user has typed a query "elf". The supplemental terms for this displayed document may include for example "christmas", "santa claus", since these terms represent concepts described in the displayed document 710.

Figure 8:
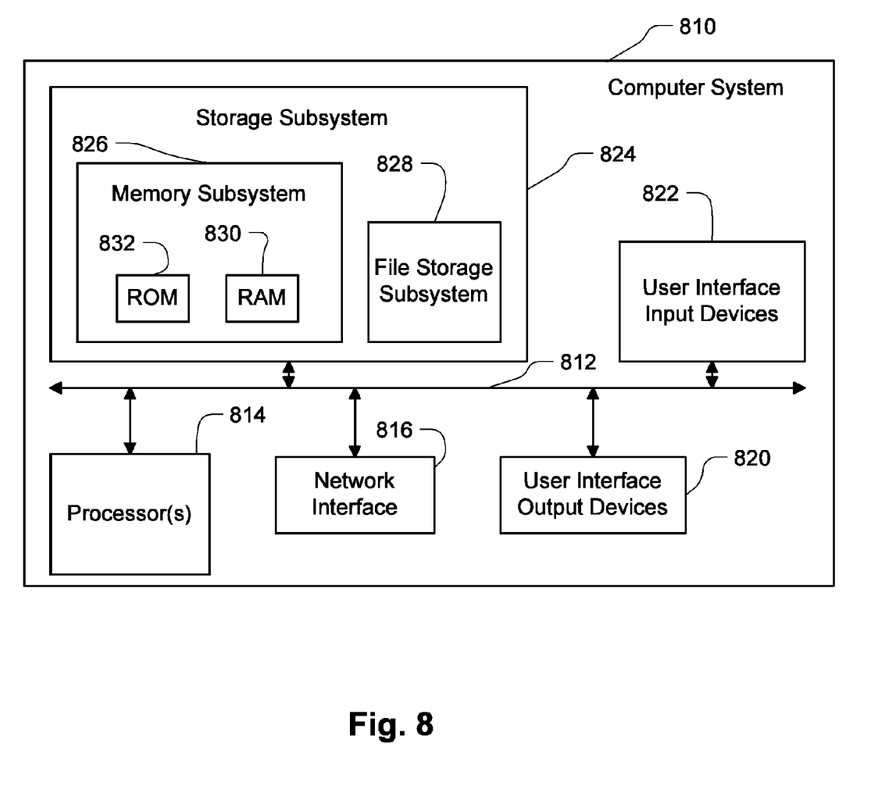
FIG. 8 is a block diagram of an example computer system.

FIG. 8 is a block diagram of an example computer system. Computer system 810 typically includes at least one processor 814 which communicates with a number of peripheral devices via bus subsystem 812. These peripheral devices may include a storage subsystem 824, comprising for example memory devices and a file storage subsystem, user interface input devices 822, user interface output devices 820, and a network interface subsystem 816. The input and output devices allow user interaction with computer system 810. Network interface subsystem 816 provides an interface to outside networks, including an interface to communication network 140, and is coupled via communication network 140 to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include possible types of devices and ways to input information into computer system 810 or onto communication network 140.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein, including the logic to provide refined search results and refined query completions according to the processes described herein. These software modules are generally executed by processor 814 alone or in combination with other processors.

Memory 826 used in the storage subsystem can include a number of memories including a main random access memory (RAM) 830 for storage of instructions and data during program execution and a read only memory (ROM) 832 in which fixed instructions are stored. A file storage subsystem 828 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem in the storage subsystem 824, or in other machines accessible by the processor.

Bus subsystem 812 provides a mechanism for letting the various components and subsystems of computer system 810 communicate with each other as intended. Although bus subsystem 812 is shown schematically as a single bus, alternative embodiments of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating the preferred embodiments. Many other configurations of computer system 810 are possible having more or less components than the computer system depicted in FIG. 8.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for providing refined search results and query completions relevant to a document currently being viewed by a user, systems including logic and resources to provide relevant refined search results and query completions, systems that take advantage of computer-assisted methods for providing relevant refined search results and query completions, media impressed with logic to provide relevant refined search results and query completions, data streams impressed with logic to provide relevant refined search results and query completions, or computer-accessible services that carry out computer-assisted methods for providing relevant refined search results and query completions. It is contemplated that modifications and combinations will readily occur to those skilled in the art, which modifications and combinations will be within the scope of the following claims.

We claim as follows:

1. A method comprising:
   receiving a partial query entered by a user into a search field in a user interface on a computing device, and receiving data indicating a document displayed on the computing device during entry of the partial query, wherein the user interface displays the document within an application different from an application including the search field, wherein at least one of the applications is different from a web browser, wherein the document includes content comprising metadata and text, and wherein the text includes terms;
   identifying query completions for the partial query based on one or more terms of the partial query, wherein at least one query completion of the query completions includes the one or more terms of the partial query and at least one term from the document that is different and in addition to the one or more terms of the partial query;
   identifying initial ranking scores for the query completions, wherein the initial ranking score for the at least one query completion is based at least in part on popularity of the at least one query completion;
   calculating similarity scores for the query completions, wherein calculating a similarity score for a given query completion of the query completions is based at least in part on similarity between the given query completion and the content in the displayed document;
   ranking the query completions based on the similarity scores and the initial ranking scores;
   selecting one or more of the query completions as refined query completions for the partial query based at least in part on the ranking; and
   providing the refined query completions for display on the computing device.

2. The method of claim 1, wherein the number of refined query completions is less than the number of query completions initially obtained for the partial query.

3. The method of claim 1, wherein selecting one or more of the query completions as refined query completions for the partial query comprises selecting a predetermined number of highest ranked of the query completions as the refined query completions.

4. The method of claim 1, further comprising identifying one or more terms based on content in the displayed document, and wherein the similarity score for the given query completion is based at least in part on similarity between the given query completion and the one or more terms.

5. The method of claim 4, wherein the terms include one or more terms representing a topic of the displayed document.

6. A system comprising:
   memory storing instructions;
   one or more processors operable to execute the instructions;
   wherein the instructions include instructions to perform the operations of:
   receiving a partial query entered by a user into a search field in a user interface on a computing device, and receiving data indicating a document displayed on the computing device during entry of the partial query, wherein the user interface displays the document within an application different from an application including the search field, wherein at least one of the applications is different from a web browser, wherein the document includes content comprising metadata and text, and wherein the text includes terms;
   identifying query completions for the partial query based on one or more terms of the partial query, wherein at least one query completion of the query completions includes the one or more terms of the partial query and at least one term from the document that is different and in addition to the one or more terms of the partial query;
   identifying initial ranking scores for the query completions, wherein the initial ranking score for the at least one query completion is based at least in part on popularity of the at least one query completion;

calculating similarity scores for the query completions, wherein calculating a similarity score for a given query completion of the query completions is based at least in part on similarity between the given query completion and the content in the displayed document;

ranking the query completions based on the similarity scores and the initial ranking scores;

selecting one or more of the query completions as refined query completions for the partial query based at least in part on the ranking; and providing the refined query completions for display on the computing device.

7. The system of claim 6, wherein the number of refined query completions is less than the number of query completions initially obtained for the partial query.

8. The system of claim 6, wherein the instructions to perform the operation of selecting one or more of the query completions as refined query completions for the partial query comprise instructions to perform the operation of selecting a predetermined number of highest ranked of the query completions as the refined query completions.

9. The system of claim 6, wherein the instructions further comprise instructions to perform the operation of identifying one or more terms based on content in the displayed document, and wherein the similarity score for the given query completion is based at least in part on similarity between the given query completion and the one or more terms.

10. The system of claim 9, wherein the terms include one or more terms representing a topic of the displayed document.

11. A non-transitory computer readable storage medium storing instructions which, when executed by one or more processors, cause the one or more processors to:

receive a partial query entered by a user into a search field in a user interface on a computing device, and receive data indicating a document displayed on the computing device during entry of the partial query, wherein the user interface displays the document within an application different from an application including the search field, wherein at least one of the applications is different from a web browser, wherein the document includes content comprising metadata and text, and wherein the text includes terms;

identify query completions for the partial query based on one or more terms of the partial query, wherein at least one query completion of the query completions includes the one or more terms of the partial query and at least one term from the document that is different and in addition to the one or more terms of the partial query;

identify initial ranking scores for the query completions, wherein the initial ranking score for the at least one query completion is based at least in part on popularity of the at least one query completion;

calculate similarity scores for the query completions, wherein calculating a similarity score for a given query completion of the query completions is based at least in part on similarity between the given query completion and the content in the displayed document;

rank the query completions based on the similarity scores and the initial ranking scores;

selecting one or more of the query completions as refined query completions for the partial query based at least in part on the rank; and provide the refined query completions for display on the computing device.

12. The non-transitory computer readable storage medium of claim 11, wherein the number of refined query completions is less than the number of query completions initially obtained for the partial query.

13. The non-transitory computer readable storage medium of claim 11, wherein the instructions which cause the one or more processors to select one or more of the query completions as refined query completions for the partial query comprise instructions which cause the one or more processors to select a predetermined number of highest ranked of the query completions as the refined query completions.

14. The non-transitory computer readable storage medium of claim 11, wherein the instructions further comprise instructions which cause the one or more processors to identify one or more terms based on content in the displayed document, and wherein the similarity score for the given query completion is based at least in part on similarity between the given query completion and the one or more terms.

15. The non-transitory computer readable storage medium of claim 14, wherein the terms include one or more terms representing a topic of the displayed document.

* * * * *